Dec. 1, 1936.                C. P. HEGAN                2,062,649
                       AUXILIARY AIR FILTER FRAME
                       Filed June 29, 1934          3 Sheets-Sheet 1
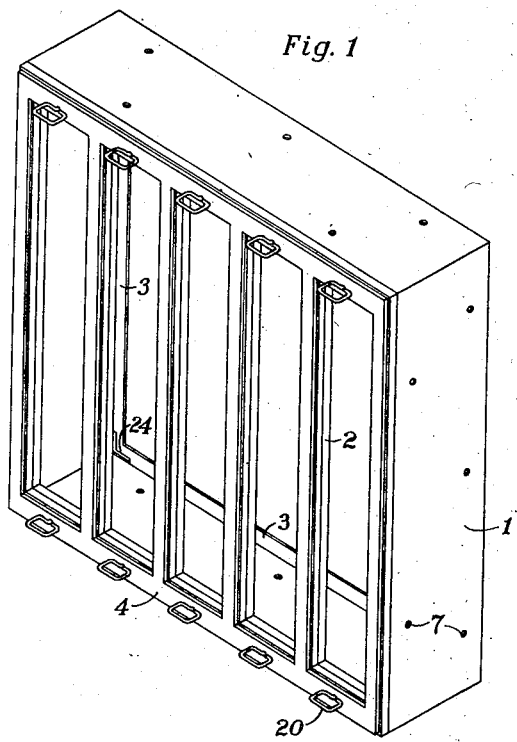
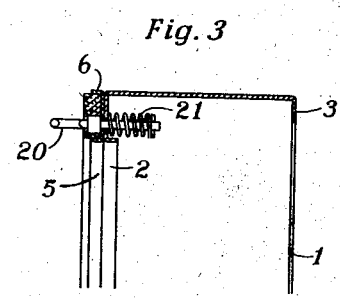
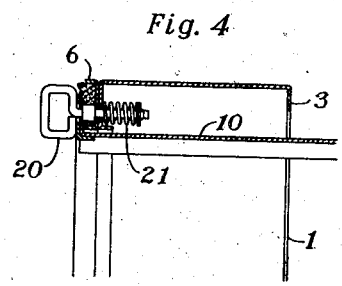
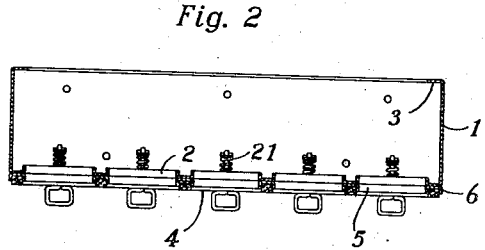
INVENTOR.
Chester P. Hegan
BY Arthur F. Robert
ATTORNEY Dec. 1, 1936.                C. P. HEGAN                 2,062,649
                      AUXILIARY AIR FILTER FRAME
                       Filed June 29, 1934           3 Sheets-Sheet 2
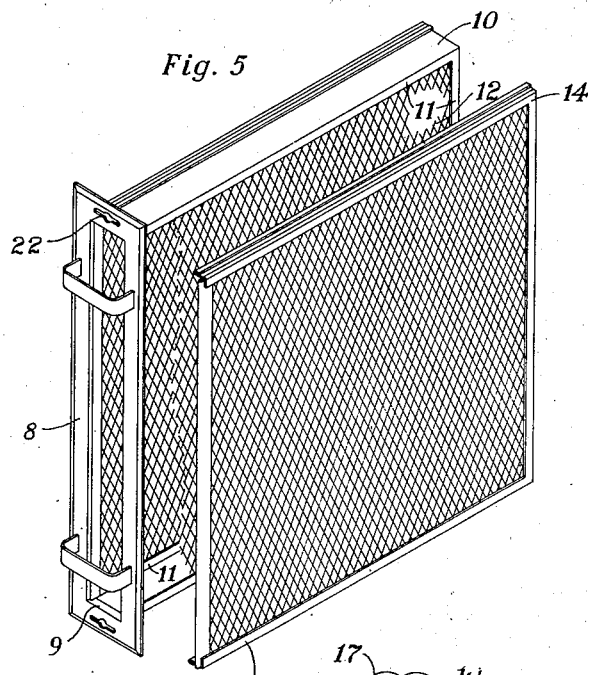
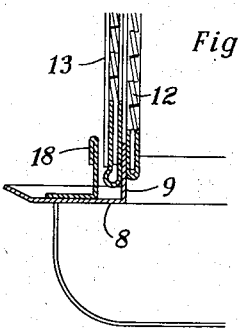
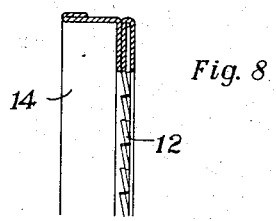
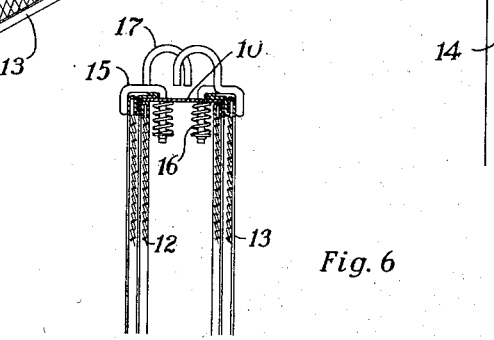
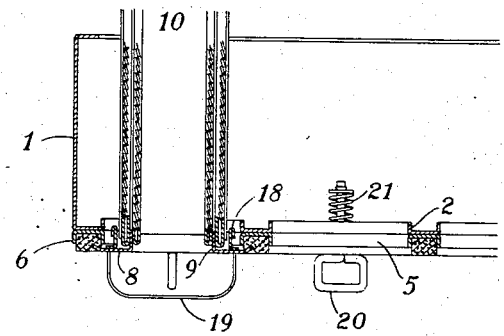
INVENTOR.
Chester P. Hegan
BY Arthur J. Robert
ATTORNEY Dec. 1, 1936.  C. P. HEGAN  2,062,649
AUXILIARY AIR FILTER FRAME
Filed June 29, 1934  3 Sheets-Sheet 3

INVENTOR.
Chester P. Hegan
BY Arthur J. Robert
ATTORNEY

Patented Dec. 1, 1936

2,062,649

UNITED STATES PATENT OFFICE 2,062,649

AUXILIARY AIR FILTER FRAME

Chester P. Hegan, Louisville, Ky., assignor to American Air Filter Company, Inc., Louisville, Ky., a corporation of Delaware Application June 29, 1934, Serial No. 732,980

7 Claims. (Cl. 183—51)

This invention relates to an auxiliary air filter frame of the type having one or more openings in its front face to receive one or more insertable pocket filter units. These filter units or pockets usually consist of a pair of opposed screen faces over which the filtering material is placed, and a shallow rectangular frame extending along the margins of the screens for holding them in spaced relation, the front end of the frame having a large opening to permit the passage of air through the pocket. Each pocket, when inserted in an opening of the auxiliary frame, is firmly held in position by securing its front or open end to the front face of the auxiliary frame.

This type of structure is used both as a ventilating filter wherein it functions to purify ventilating air, and as a dust arrestor or collector wherein it functions to separate or recover objectionable or valuable particles conveyed by an air stream. When used for ventilating purposes, the filter material is ordinarily removed, when soiled, and replaced by a clean medium. On the other hand, when used for recovery purposes, such medium is ordinarily renewed a number of times before replacement by vibrating the pockets so as to cause adhering particles to fall by gravity into a hopper. To this end, dust collectors are additionally provided with a vibrating mechanism which is arranged to engage the rear end of each pocket, that is to say, the closed or free end.

In order to obtain the requisite strength and rigidity, it has been considered necessary, heretofore, to construct the auxiliary frame of angle and channel irons. This has been done by making the auxiliary frame in the form of a box-like skeleton composed of angle irons, and arranging the channel irons in back-to-back relation across the front face in order to form the pocket frame openings. While the resulting structure is extremely rigid, it has the objection of being expensive and heavy. Furthermore, although the auxiliary frame for a ventilating filter can be made smaller, i. e., of less depth than that of a dust collector, it has, nevertheless, been found less expensive to manufacture an auxiliary frame of this general type on a production basis, in standard sizes suitable for both uses.

The principal object of this invention is to eliminate the waste of material occurring in the use of over-size auxiliary frames for ventilating filters, and, at the same time, reduce the cost and weight of the auxiliary frames for both filters without sacrificing the strength and rigidity required in structures of this type.

Another object is to provide a sturdy auxiliary frame for ventilating filters which can be easily, quickly and inexpensively manufactured, and to provide an additional or vibrator frame which is adapted for attachment to said ventilating frame to render it suitable for use as the auxiliary frame of a dust collector.

Another object is to provide means for rendering the air seal between the pocket and auxiliary frame better and more lasting than heretofore employed.

A further object is to provide the auxiliary frame with a simple, inexpensive form of front face structure possessing a high degree of strength and rigidity.

The invention is illustrated in the accompanying drawings, wherein:—

Figure 1 is a perspective of a casing constructed in accordance with my invention for use as the auxiliary frame of a ventilating filter;

Figure 2 is a horizontal sectional view thereof;

Figures 3 and 4 show the filter pocket locking mechanism in the unlocking and locking positions respectively;

Figure 5 is a perspective view of a filter pocket with one outer screen face pulled slightly away from the pocket;

Figure 6 is a horizontal sectional view through a casing or auxiliary frame with a pocket in the inserted position;

Figure 7 is a detail of a front corner of the pocket;

Figure 8 is a detail of a pocket face cover member;

Figure 9:
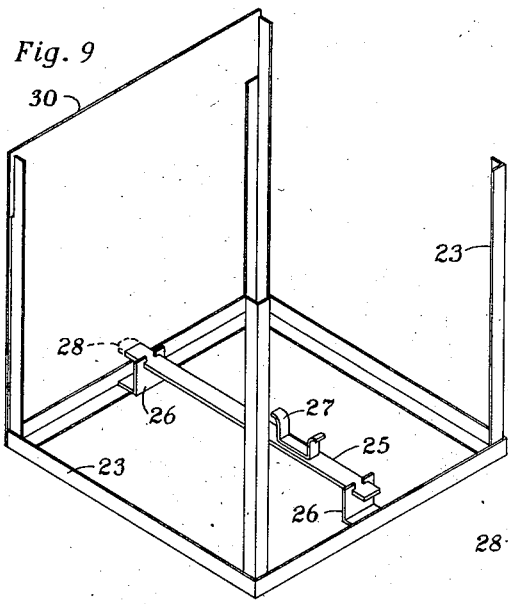
Figure 9 is a perspective view of an unattached vibrator frame.
Figure 10:
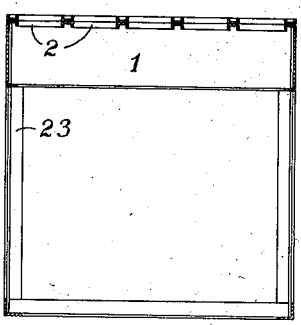
Figure 10 is a section through the casing with vibrator frame attached thereto.
Figure 11:
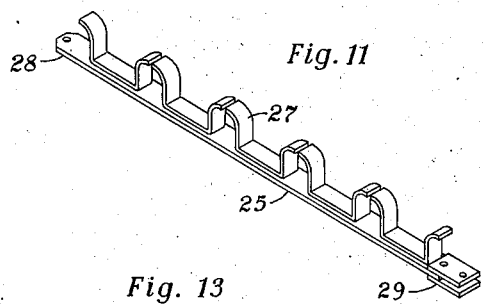
Figure 11 is a perspective view of the vibrator bar.
Figure 12:
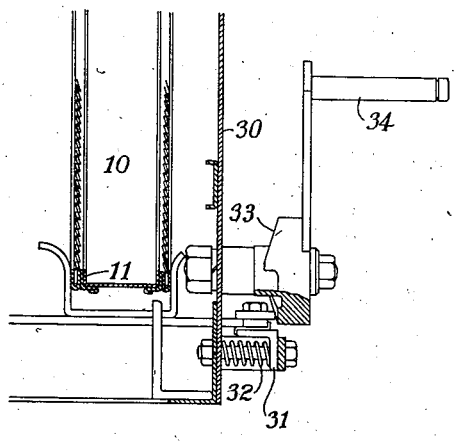
Figures 12 and 13 are views showing the vibrating mechanism at different positions.
Figure 13:
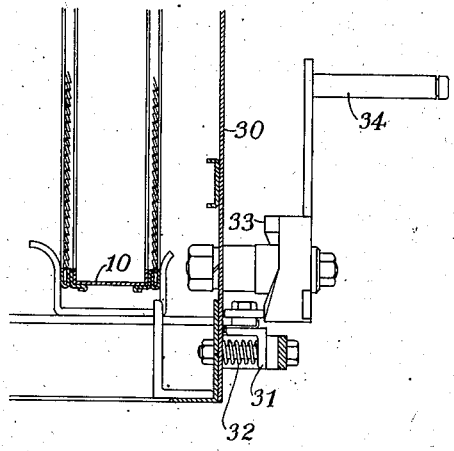

*Sheet metal auxiliary frame for ventilating filters and dust arrestors*

I have found it possible to construct, entirely from sheet metal, a simply formed auxiliary frame having the requisite strength and rigidity and yet being of relatively light weight and low manufacturing cost as compared to the angle and channel iron structure previously mentioned. Accordingly, I blank a suitable sheet of metal to form a series of long, rectangular pocket-frame openings arranged in side by side relation on that portion of the sheet which corresponds to what may be termed the "front face" of the auxiliary frame. By a stamping or forming operation, the sheet is then bent on each side of the front face to form the side (including top and bottom) walls of the auxiliary frame or casing 1. During this forming operation, the marginal edges, delimiting each front face opening, may also be bent rearwardly to provide the strengthening flanges 2. The rear face of the casing is entirely open except for a strengthening flange 3 which is formed by bending the rear marginal edge of the casing inwardly at right angles from the side walls.

Now, since the pocket frames are to be secured to the front face of the casing, it is more or less necessary to strengthen or reinforce that face to provide the rigidity required to withstand the strains produced during use. While this may be accomplished in various ways, I have found that it can be easily, quickly and inexpensively done, without adding much weight to the structure, simply by welding or otherwise securing to the front face of the casing 1 a similarly formed, but reversely arranged, auxiliary face 4. To this end, another sheet of metal is blanked to provide a corresponding series of pocket-frame openings, and, formed to provide, along the marginal edges of the openings and of the front face, as well, forwardly turned strengthening flanges 5 and 6 respectively. This type of auxiliary face is particularly advantageous not only because it imparts the necessary strength to the front face of the auxiliary frame, but also because it can be formed with the same tools and in the same way as the front face of the casing, thus facilitating production and reducing the cost.

At this point, it may be noted that it is customary to secure a strip of felt, or some other material suitable for sealing purposes, along the edges of the front face pocket-frame openings. Heretofore, it has been found difficult to keep in place, the sealing material which extends along the outer marginal edge of the front face, and, although it is ordinarily both glued and riveted to the front face for this purpose, it nevertheless requires attention or replacement from time to time in order to maintain a good seal. I have discovered that this difficulty is entirely avoided, in the present structure, by virtue of the marginal flanges 6 of the auxiliary front face 4. These flanges cooperate with the adjacent flanges 5 to provide a channel for the sealing material, and function so effectively to hold the sealing material in proper position as to render necessary only the use of some simple retaining means such as glue.

In use, it is common practice to bolt the auxiliary frames or casings to each other in side by side relation to form a straight bank of openings which is one frame deep, one or more frames long and one or more frames wide. For this purpose, all sides of each auxiliary frame are provided with one or more rows of bolt holes 7, two such rows being shown.

*Filter unit or pocket frame structure*

The frame of the filter unit or pocket may be constructed in any suitable manner. In the structure illustrated, it includes a sheet metal end plate 8 (Figures 5-8), having a centrally positioned air passage opening, the marginal edge of which is delimited by a rearwardly turned flange 9. The end plate 8 bridges the open end of a U-shaped frame member 10, which provides the marginal walls of the pocket, the ends of this member being welded or otherwise secured to the end sections of the flange 9. The marginal edges 11 on both sides of U-shaped member 10 are bent or flanged to provide, in cooperation with the corresponding sections of the flange 9, an inwardly facing continuous surface on each side of the pocket to which opposed inner screens 12 may be permanently secured. The filter medium may be arranged over and against the outer face of each screen 12 and held in place by separate cover members, each composed of an outer screen 13 and a nesting frame 14 in which the screen is mounted.

Each nesting frame 14 is U-shaped longitudinally and dimensioned to fit or nest over one side of the U-shaped pocket frame member 10 throughout its extent. In order to hold the cover member in place, a holding member 15 is rotatably mounted on the rear marginal wall of the pocket. This holding member is arranged for movement from the position shown in Figure 6, in which it clamps the rear edge of the cover member to the frame 10, outwardly and thence rotatably to another position at right angles thereto, in which it releases the cover member. The holding member is urged inwardly by a spring 16 and is provided with a finger piece 17 by which it may be engaged for manual operation to either of its positions. Since the holding member engages only the rear edge of the cover member, it is desirable to provide means for holding the other edges tightly against the filter medium; otherwise, the air seal may be impaired. This may be readily accomplished by limiting the outward movement of the front edge of each outer screen 13. To this end, an angle member 18 is secured to the rear face of the end plate 8 on opposite sides of the filter pocket, the member 18 cooperating with the flange 9 (see Figure 7) to define a channel in which the front edge of the screen 13 extends in its operative position. The channel thus provided is slightly wider than the screen 13 to provide a small clearance therebetween to permit easy insertion and withdrawal of the screen 13. By extending the filter medium well into the channel, there will be no appreciable leakage due to the clearance provided.

When it is desired to remove and replace any filter medium held between the screens 12 and 13, it is only necessary to pull the holding member 15 rearwardly sufficiently to clear the edge of the frame member 14 and thence rotate the holding member away from the frame 14. The frame 14 may then be pulled or slid from its nesting position, thus exposing the filter medium for removal purposes.

In order to facilitate the insertion and removal of the pocket frames into and out of the auxiliary frame, the end plate 8 of each pocket frame is provided with one or more handles 19 which are arranged to bridge the air passage opening. When the pocket frames are inserted, the sealing edges of the end plate 8 engage the sealing strips on the front face of the auxiliary frame to prevent leakage. Now, in order to provide a more effective seal, the sealing edge of the end plate 8—in this case its outer marginal edge—is slanted rearwardly at an acute angle to the end plate proper so as to bite into the sealing material. In this manner, a continuous seal is effectively made and maintained despite any vibrations of the pockets or any surface variations of either the end plate 8 or sealing material.

Locking means holding pockets to sheet metal frame

For the securement of the pocket frame in filtering position, various holding devices have been proposed. While any of these may be utilized, I prefer to use the arrangement illustrated, wherein a finger piece 20, composed of a straight section of stiff round wire, bent at one end to form a loop, is used. A finger piece of this character is rotatably mounted in the casing at each end of each pocket-frame opening, with its shank projecting into the frame. The loop is urged against the frame by a spring 21. The end plate 8 is provided with a slot 22 (see Figure 5) to receive the loop and the pocket-frame is locked securely to the casing by turning the loop across the slot 22. An advantageous feature of this construction resides in the fact that when the loop is turned to the locking or releasing positions, the rounded surface of the wire acts as a smooth cam, permitting such movement to be made with a slight effort. This enables the use of a spring 21 which is stiff enough to hold the pocket frame tightly as necessary without rendering the locking and unlocking operations difficult. Furthermore, the use of a smooth round wire avoids the scarring of the end plate which is incident to the use of the locking devices heretofore employed and which made their operations more difficult.

It will be readily appreciated that the auxiliary frame structure can, due to its simple form, be easily, quickly and inexpensively manufactured, and that such frame will also be of very light weight. The auxiliary and pocket frame structures are both suitable for use interchangeably as ventilating filters and as dust collectors. Where, however, it is desired to vibrate the filter pockets, as is customary in dust collecting installations, some means must be provided for this purpose. In accordance with my invention, I provide what may be termed a vibrating frame structure and arrange it for attachment to the casing so as to render it suitable for use as the auxiliary frame of a dust collector.

Vibrator attachment for dust arrestors

The vibrator frame, which may be constructed in any suitable manner, is shown in Figure 9 as consisting of angle irons 23 arranged to form a box-like skeleton which is open at one end. The open end of the skeleton is attached to the auxiliary frame, the attachment being effected by extending the ends of the angle irons 23 through suitable openings 24 (see Figure 1) in the rear corners of the auxiliary frame and then welding or otherwise securing the angles to the frame.

The vibrating mechanism includes a vibrating bar 25 which extends transversely across the rear inner face of the vibrator frame. This bar is slidably mounted on brackets 26 carried by the vibrator frame. The bar contains a number of saddles 27 each of which is positioned to receive the rear end of a pocket frame. Now, it will be obvious that as the bar is vibrated, the saddles will engage and likewise vibrate the pocket frames.

The mechanism by which the bar is vibrated is connected to one end 28 of the bar, and, since a number of units may be arranged in a row, the opposite end 29 of the bar is adapted for connection to the adjacent end 28 of the next bar. In other words, the bars 27 of serially arranged frames are connected in series so that they may all be vibrated by a single vibrator on an end frame of the series. In this connection, it may be pointed out that when a single vibrating unit is installed, the four side-walls of the skeleton frame are each blanked off by a wall of material, such as sheet metal, whereas when one or more rows of units are installed to form a bank, it is necessary only to blank off the walls which form the margin of the bank. Thus it is evident that at least one wall of a marginal unit will be blanked off in any installation. Because of this, and, since the vibrator is positioned at the end of a row, I provide the skeleton frame, which is intended to be positioned at the vibrator end of the row, with an end wall 30 upon which the vibrator may be conveniently mounted. It will be noted that the free ends of the angle irons 23 which are secured to the auxiliary frame adjacent the wall 30, are cut away to provide a recess for the corresponding wall of the auxiliary frame.

The vibrator is connected to the end 28 of the bar 27, this end being arranged to project through an opening in the wall 30. The vibrator includes a bracket 31 mounted on the projecting end of the bar which is urged to the position of greatest projection by a spring 32 mounted on the wall 30 and acting against the bracket 31. The vibrator also includes a cam 33 which is rotatably mounted on the wall 30 in position to engage the bar 27, and, during partial rotation, force the bar inwardly against the action of spring 32. Further rotation causes the cam to release the bar whereupon the spring 32 snaps the bar back to its original position. A handle 34 is provided for rotating the cam but such rotation may, of course, be effected by other means.

Having described my invention, I claim:

1. An auxiliary frame of the class described comprising a sheet metal casing having a front face formed with an opening to receive a filter unit, the front face being rearwardly turned along said opening to provide flanges and along its outer marginal edge to provide side walls for the casing, and an auxiliary front face secured to the front face of said casing and having an opening and an outer marginal edge which substantially correspond to the opening and the outer marginal edge of the front face of the casing, said auxiliary face being forwardly turned both along said corresponding opening and along its outer marginal edge to provide flanges.

2. A pocket-frame of the class described, comprising opposed screen faces, a frame supporting said screens in spaced relation and providing the marginal walls of the pocket, said frame including an end plate having an air passage opening, and a sealing edge on said plate which slants rearwardly therefrom.

3. In combination with an auxiliary frame having an opening, channels surrounding said opening and sealing material in said channels, of a pocket-frame insertable into said opening, said pocket-frame having an end plate which extends over said sealing material in the inserted position, and a sealing edge secured to and slanted rearwardly from said plate so as to bite into the sealing material in the inserted position.

4. An air filter frame of the class described comprising a casing having a front face opening to receive an insertable filter pocket and a rear face opening through which an inserted pocket projects, said casing being suitable for use as the auxiliary frame of a ventilating filter, and means for rendering said casing suitable for use as the auxiliary frame of a dust collector, said means including a unitary vibrator frame separately securable to the casing in position to project rearwardly therefrom along the projecting portion of an inserted pocket.

5. An air filter frame of the class described comprising a rectangular casing having a front face opening to receive an insertable filter pocket and a rear face opening through which an inserted pocket projects, said casing being suitable for use as the auxiliary frame of a ventilating filter, and means for rendering said casing suitable for use as the auxiliary frame of a dust collector, said means including a unitary rectangular frame separately securable to the casing in position to project rearwardly therefrom around the projecting portion of an inserted pocket.

6. An air filter frame of the class described comprising a sheet metal casing having a front face opening to receive an insertable filter pocket and a rear face opening through which an inserted pocket projects, said casing being suitable for use as the auxiliary frame of a ventilating filter, and means for rendering said casing suitable for use as an auxiliary frame of a dust collector, said means including a unitary box-like skeleton vibrator frame open at one end and having at its open end members which are adapted for engagement with and securement to said sheet metal casing in position to cause the skeleton frame to project from said sheet metal casing rearwardly around the projecting portion of an inserted pocket.

7. An auxiliary frame of the class described comprising a casing having a front face formed with a series of rearwardly flanged openings, and an auxiliary sheet metal front face rigidly secured to the front face of said casing to reinforce the latter and form a permanent part thereof, said auxiliary front face having a corresponding series of forwardly flanged openings and having its outer marginal edge also forwardly flanged, said openings of the auxiliary front face cooperating with corresponding openings in the casing front face to form a recess through which a filter pocket may extend when mounted on the casing.

CHESTER P. HEGAN.